Figure 1:
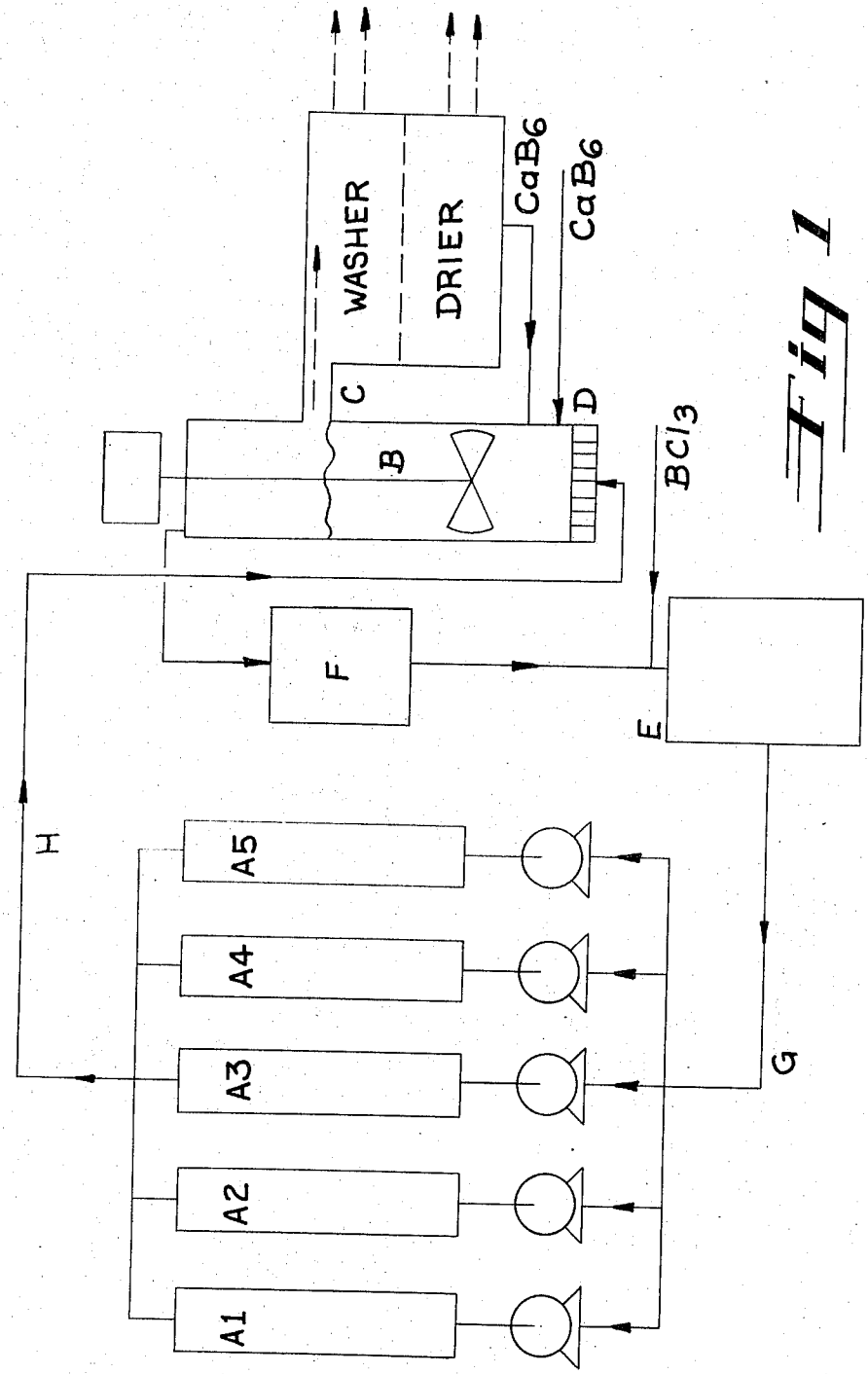

United States Patent [19]  
Kratel et al.

[11] 3,872,214  
[45] Mar. 18, 1975

[54] PROCESS FOR THE TREATMENT OF WASTE GASES FROM THE SEPARATION OF BORON

[75] Inventors: Günter Kratel, Sankt Mang; Günter Stohr, Kempten am Gohlenbach; Günter Wiebke; Volker Frey, both of Munich, all of Germany

[73] Assignee: Elektroschmelzwerk Kempten GmbH, Munich, Germany

[22] Filed: Mar. 16, 1972

[21] Appl. No.: 235,137

[30] Foreign Application Priority Data
Apr. 1, 1971  Germany............................ 2115810

[52] U.S. Cl.................. 423/298, 423/240, 423/292
[51] Int. Cl............................................ C01b 35/00
[58] Field of Search..................... 423/292, 298, 240

[56] References Cited
UNITED STATES PATENTS

| | | | |
|---|---|---|---|
| 2,839,367 | 6/1958 | Stern et al. | 423/298 |
| 3,144,306 | 8/1964 | May et al. | 423/292 |
| 3,488,152 | 1/1970 | Kuehl | 423/298 |
| 3,565,590 | 2/1971 | Bracken | 423/342 |
| 3,743,698 | 7/1973 | Kratel et al. | 423/292 |

*Primary Examiner*—G. O. Peters
*Attorney, Agent, or Firm*—Francis M. Crawford

[57]  ABSTRACT

The present invention relates to the reaction of waste gases resulting from the reaction of boron halides with hydrogen by reacting said waste gases at tempertures ranging from 300° to 900° C with borides selected from the group consisting of alkali metals, alkaline earth metals and earth metals.

5 Claims, 3 Drawing Figures

PROCESS FOR THE TREATMENT OF WASTE GASES FROM THE SEPARATION OF BORON

The present invention relates to the reaction of boron halide-containing gases with borides of alkali metals, alkaline earth metals and earth metals at temperatures ranging from 300° to 900° C., and preferably at temperatures ranging from 450°–650°C.

Metallic boron has previously been deposited onto metallic surfaces from boron halide-hydrogen mixtures, e.g., boron trichloride or boron tribromide mixed with hydrogen. During recent years such processes have become of considerable importance since the purest forms of boron required for use in the semiconductor technology have generally been produced by such gas phase procedures. Boron precipitated on tungsten has been found to be particularly useful for such purposes. High purity boron is also quite important for other uses including reinforcement materials for production of parts which are under high stresses and strains.

The particular method used for the recovery of the boron depends largely upon whether it is to be used in powder, compact, amorphous or crystalline form. In either case, however, the process is based upon the reaction:

$$2\ BX_3 + 3\ H_2 \rightarrow 2\ B + 6\ HX \qquad 1$$

in which X represents a halogen such as chlorine, bromine or iodine. In the above reaction, however, complete conversion of the boron halide is not obtained and in the production of boron filaments using same conversions of only 4–6% are ordinarily obtained, since when efforts are made to push the equilibrium in favor of increased boron production the increase in the concentration of the hydrogen halide affects unfavorably the quality of the boron filament. Because of the latter fact the economical recovery of boron requires treatment of the complex mixture of reaction products from which the boron has been separated, thus increasing materially the cost of the latter.

The hydrogen halide and boron halide, for example, may be condensed and separated from the waste gases by fractional distillation. However, such an operation is expensive and it is difficult to obtain completely satisfactory results. Even when 80% utilization of the boron halide is deemed satisfactory, at a 5% conversion one must recover from the waste gases 98.7% of the boron halide contained therein. This requires a complicated technical setup and the latter is not free from hazard since the waste gases contain boron-hydrogen compounds which may spontaneously decompose.

It has now been discovered, in accordance with the present invention, that the disadvantages of the prior processes for the recovery of boron by reaction of boron halides with hydrogen can be overcome by reacting the waste gases formed during the reaction, at temperatures of the order of 300°–900°C, with borides of the alkali metals, alkaline earth metals or aluminum, either singly or in mixtures thereof. Under such conditions the hydrogen halide in the waste gases react with the alkali, alkaline earth or earth boride, for example, calcium hexaboride, in accordance with the following equation:

$$CaB_6 + 20\ HX \rightarrow CaX_2 + 6\ BX_3 + 10\ H_2 \qquad 2$$

boron halide, calcium halide and hydrogen being formed. The calcium halide, or other alkali, alkaline earth or halide formed in the reaction can be readily separated from the reaction vessel, as for example, by a suitable trap mechanism, and may be replaced with fresh alkali, alkaline earth or earth boride. If halogen, as well as boride, is added to the reactor a combination of reactions (1) and (2) takes place, as for example:

$$CaB_6 + X_2 \rightarrow CaX_2 + 6\ B$$
$$3\ CaB_6 + 2\ BX_3 \rightarrow 3\ CaX_2 + 20\ B$$

in which the reaction gases, which serve for the transportation of boron, are continuously recycled. The requirements with respect to the purity of the reaction gases are often very high. However, it was most surprisingly found that no enrichment of the boron-hydrogen compounds or of any impurities which would deleteriously affect the quality of the precipitated boron took place.

The boron compound to be used in the process of the present invention will depend essentially upon economical considerations. Preferably, it should have a high boron content and be easily and economically prepared from cheap raw materials. Calcium hexaborate, which can be easily and economically prepared from colemanite and carbon, or from boron oxide, calcium oxide and carbon, is especially suitable. However, other borides, such as lithium boride, alumin boride, magnesium boride, and the like, may be satisfactorily employed.

The preferred reaction temperature lies between 450° and 650° C. The selection of the most desirable reaction temperature, however, does not depend solely on the particular boride being used.

It is essential to take into consideration the concentration of the hydrogen halide in the waste gases and the desired degree of conversion. These factors will depend upon the intended use of the precipitated boron since the amount of hydrogen halide in the waste gases may affect the quality of the precipitated boron. A particular amount of hydrogen halide in the waste gas may be either damaging or favorable, depending upon the desired quality of the boron being produced. Consideration must also be given to the permissible or desirable content of boron-hydrogen compounds. The content of the latter can be most effectively regulated by the addition of halogen to the reaction mixture.

The reaction of the present invention can be carried out at either atmospheric, reduced or elevated pressures. Preferably, it is carried out at the pressure at which the boron is precipitated, which is generally at atmospheric pressure but any pressure between 100 Torr and 50 atmospheres gauge can be satisfactorily employed.

The reaction can be carried out in a wide variety of installations customarily used for reacting solids with gases at elevated temperatures. Use can be made of solid bed, flowing bed and fluidized reactors. In solid bed reactors, the boride can be used in the form of coarse pieces, pellets or as a coating upon inert supporting materials.

In flowing bed reactors the coarse or fine grained boride is moved through the reactor space countercurrent to the flow of the waste gases. The supply of fresh boride and the removal of the metal halide or partially reacted boride is readily effected through traps. The rotary mixing-table furnaces used for the roasting of pyrites are, for example, suitable for this purpose.

When using fluidized bed reactors, a portion of the boride stream is preferably withdrawn, the metal halide separated by washing or scrubbing and then returned to the process. Technically prepared borides generally contain some boron oxide which sinters at temperatures above 650°C and hence may cause lump formation. Accordingly, when using fluidized bed reactors it is preferred to operate at temperatures below 650°C. The formation of lumps in either the fluidized bed or flowing bed reactors can be prevented by the use of mechanical agitation and conveying devices.

The preferred size of the boride particles used as the starting material, depending upon the particular type of reactor used, is generally between 0.1 and 15 mm.

Entrained particles of solids in the gases leaving the reactor may be removed by filters or other conventional means, so that the gases may again be used in the precipitation of the desired boron, or for other desired purposes.

The invention is further illustrated by the following specific examples. It is understood, however, that the process described above is not specifically limited thereby either as to the specific procedures, amounts of materials or temperatures set out therein.

EXAMPLE 1

The apparatus used in this experiment is illustrated in FIG. 1, wherein A1-A5 represent five reaction chambers through each of which was passed a tungsten wire of 10 m$\mu$ diameter heated electrically to 1150°–1250°C. Through each of these reaction chambers was then passed boron trichloride from reservoir E, through conduit G at the rate of 1,200 grams per hour and hydrogen at the rate of 290 liters per hour. The waste reaction gases, leaving the reaction chambers through conduit H, contained 6.3%, by volume of hydrogen chloride, corresponding to a boron precipitation of 4.5%, calculated on the basis of the boron trichloride employed.

The waste gases from the above operation were then conveyed by the conduit H through the perforated bottom of the regenerator B constructed of V4A steel and provided with a mechanical agitator. Its cross section was 400 mm and its height 600 mm. The fluidized bed regenerator contained 30 kg. of calcium hexaboride having a starting grain size of not greater than 0.2 mm which was maintained at a temperature of 550°–570°C by means of electrical heating. The waste gases leaving the regenerator contained 1.5–2%, by volume, of hydrogen chloride. The solids entrained in the gases were collected on the filter F and then returned to the reservoir E for reuse in the reaction chambers A1–A5.

The calcium chloride formed in the regenerator B was continuously separated from the calcium hexaboride in the fluidized bed through the trap C, the calcium chloride being dissolved in water in the washer and the residual calcium hexaboride dried in the drier and returned at D to the regenerator B. The reaction losses were replenished by metering into the circulating reaction mixture 33.8 grams of calcium hexaboride at D per hour and 25.2 grams of boron trichloride per hour at E.

After establishment of equilibrium the concentration of the hydrogen chloride reaching the fluidized bed regenerator was approximately 8%, measured at H, and approximately 2%, by volume, measured at G.

The boron filament, produced as above described, had a diameter of 0.1 mm and contained 13%, by weight, of tungsten. Its tensile strength was 370 Kp/mm$^2$ and its E-Modulus was 45,000 Kp/mm$^2$.

EXAMPLE 2

Figure 2:
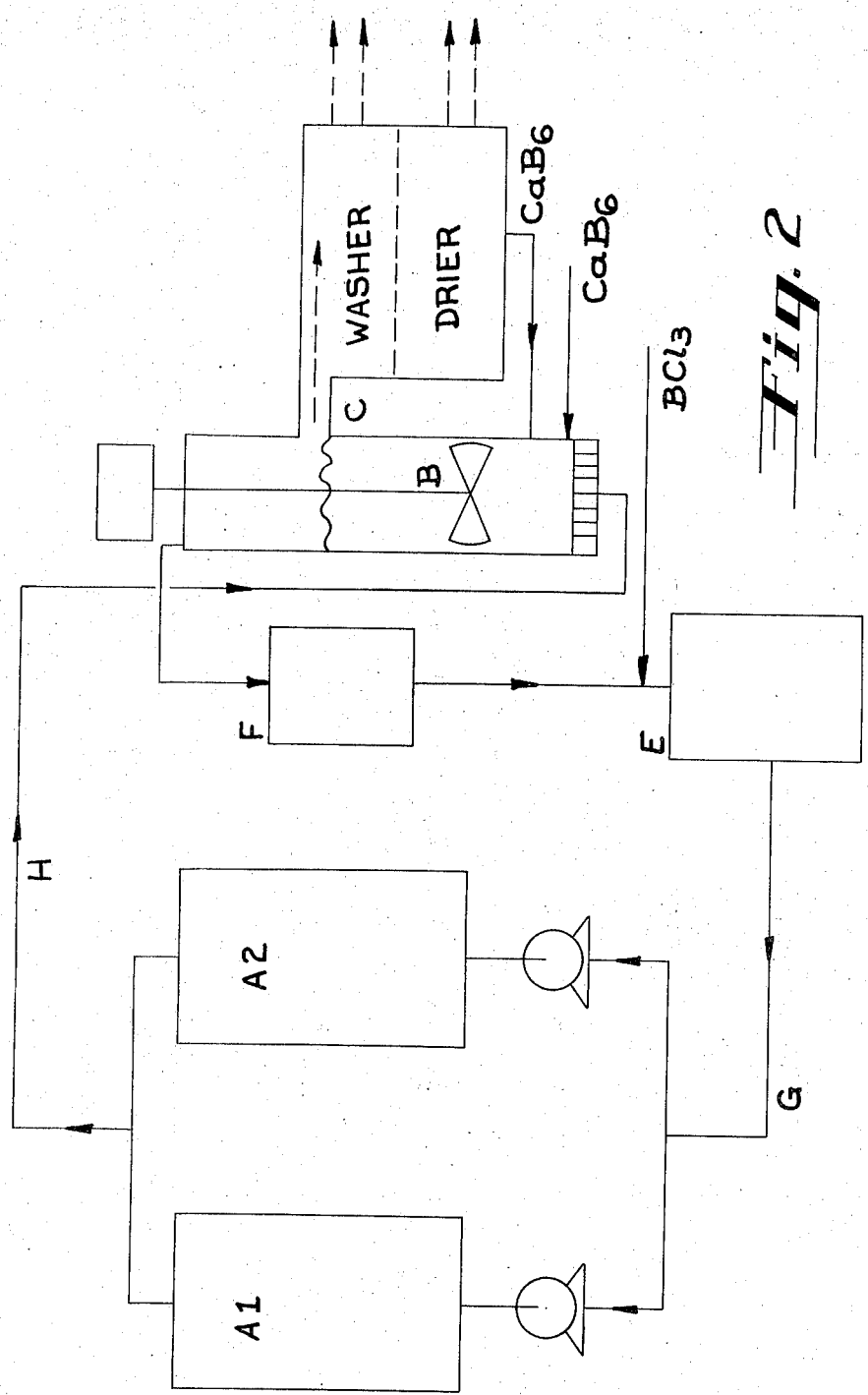

The apparatus used in this experiment is illustrated by FIG. 2. Into each of the reaction chambers A1 and A2 was placed a boron rod 20 cm in length and 5 mm in thickness. After raising the temperature of these rods to approximately 1,500°C by resistance heating 50 grams per hour of boron trichloride and 50 liters of hydrogen per hour were introduced into each reaction chamber. As the boron rods increased in thickness the amounts of boron trichloride and hydrogen were increased until at the end of 6 hours 500 grams per hour of boron trichloride and 500 liters per hour of hydrogen were being circulated through each reaction chamber.

The waste gases leaving the reaction chambers contained 8.5%, by volume, of hydrogen chloride. These waste gases were then treated as described in Example 1 and found to contain 1.5–2%, by volume, of hydrogen chloride when leaving the fluidized bed regenerator B.

At the end of six hours the amount of boron deposited in each chamber amounted to 45 grams and had a purity of 99.8%.

EXAMPLE 3

Figure 3:
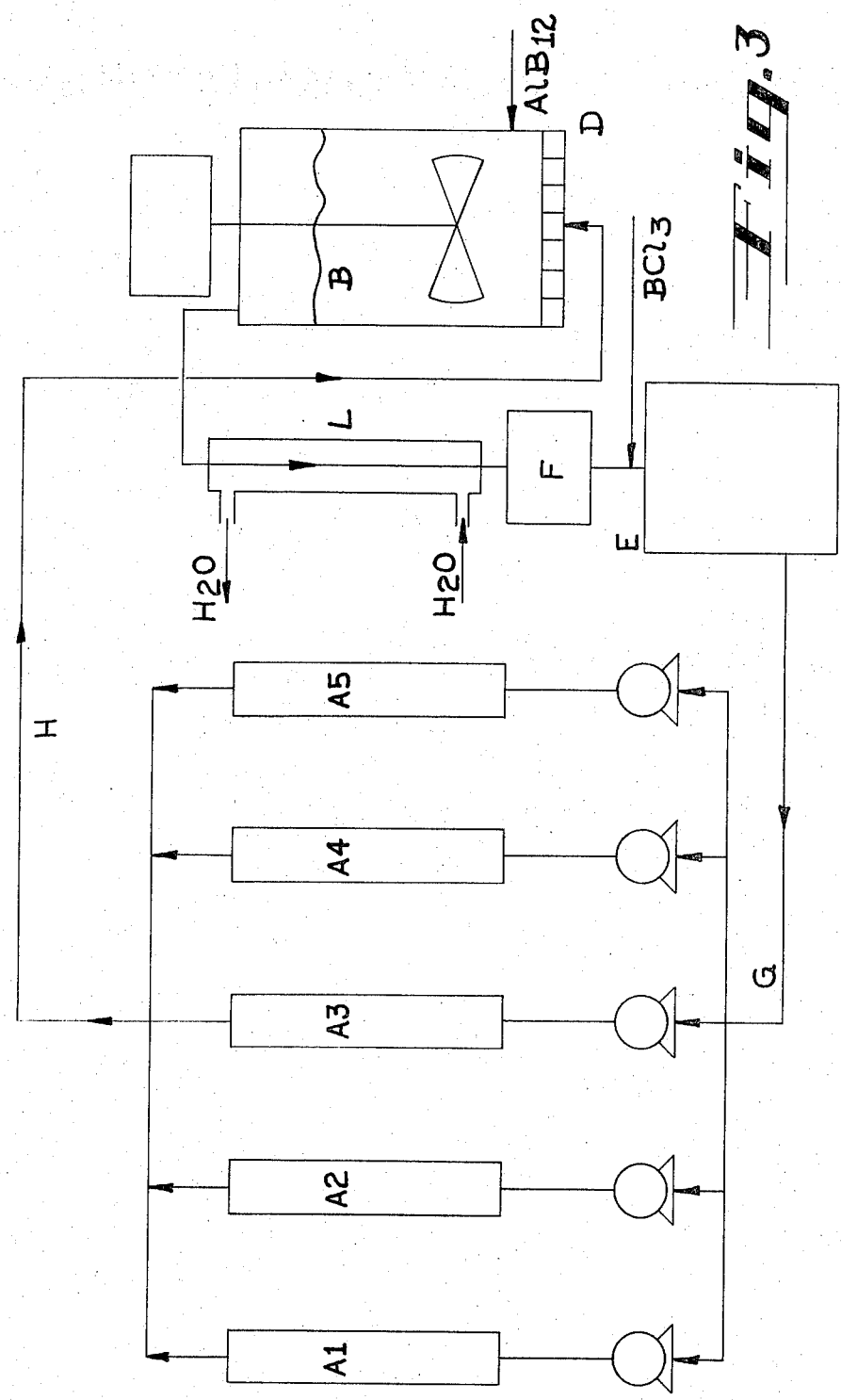

The apparatus used in this experiment is shown in FIG. 3. The apparatus and procedure employed were similar to those of Example 1 with the exception that the waste gases were treated with aluminum dodecaboride and the gases leaving the regenerator were cooled to separate the aluminum chloride. In this experiment 25 kg of aluminum dodecaboride having an initial grain size of 0.2 mm were placed in thee regenerator B and maintained at a temperature of 550°–570°C by means of electrical heating. The gases leaving the regenerator contained 1.3–2%, by volume, of hydrogen chloride. These gases were cooled to 20°C by means of the Liebig condenser L to precipitate the aluminum chloride formed, and then passed through the filter F for the purpose of removing entrained solids.

When using aluminum dodecaboride for removing the hydrogen chloride from the waste gases the removal of products from the regenerator by means of traps was not necessary because of the fact that both the boron trichloride and the aluminum trichloride were volatile. In order to replenish the materials consumed during the operation there was added during each hour 30 grams of aluminum dodecaboride at D and 18.8 grams of boron trichloride at E, using a metering device.

The finished boron filament had a diameter of 0.1 mm and a tungsten content of 13%. The mechanical properties of the filament corresponded to those listed in Example 1.

What is claimed is:

1. In the process of producing boron by reacting boron halides with hydrogen at elevated temperatures, the steps which comprise reacting at temperatures of the order of 300° to 900°C the waste reaction gases from said boron-producing step, and consisting essentially of hydrogen halide and boron trihalide, with a boride selected from the group consisting of alkali metal, alkaline earth metal and aluminum borides, whereby said boride reacts with the hydrogen halide in said waste gases, thereby forming the corresponding metal halide, boron trihalide and hydrogen, and returning said mixture of boron trihalide and hydrogen to the original reaction for the formation of additional boron.

2. Process according to claim 1, wherein said reaction is effected at temperatures ranging from 450° to 650°C.

3. Process according to claim 1, wherein the boride is calcium hexaboride.

4. Process according to claim 1, wherein the boride is aluminum dodecaboride.

5. In a process for the treatment of waste gases resulting from the reaction of boron halides with hydrogen to produce boron, the improvement which comprises reacting said waste gases, at temperatures of the order of 300° to 900°C, with borides selected from the group consisting of alkali metal, alkaline earth metal and aluminum borides.

* * * * *